UNITED STATES PATENT OFFICE.

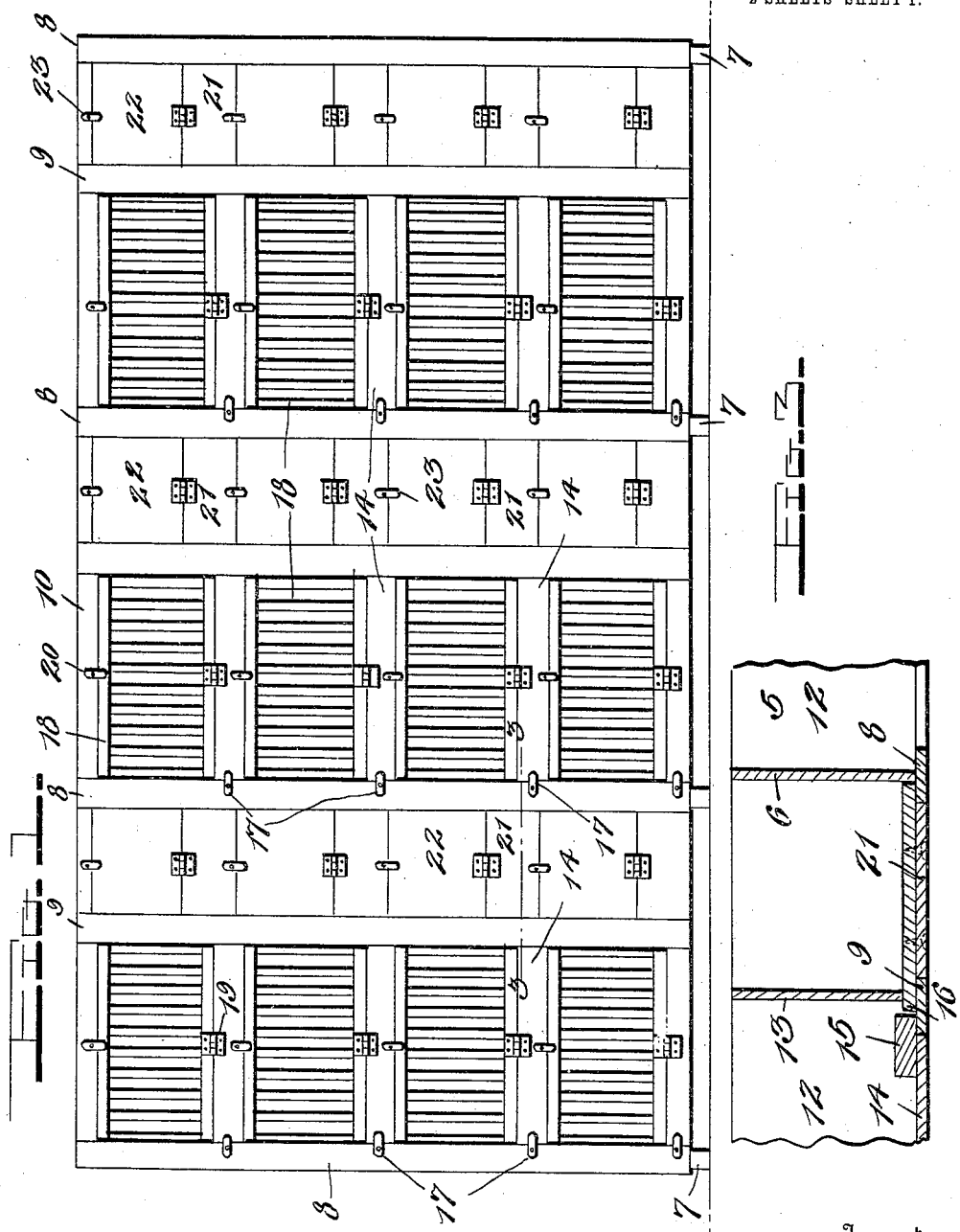

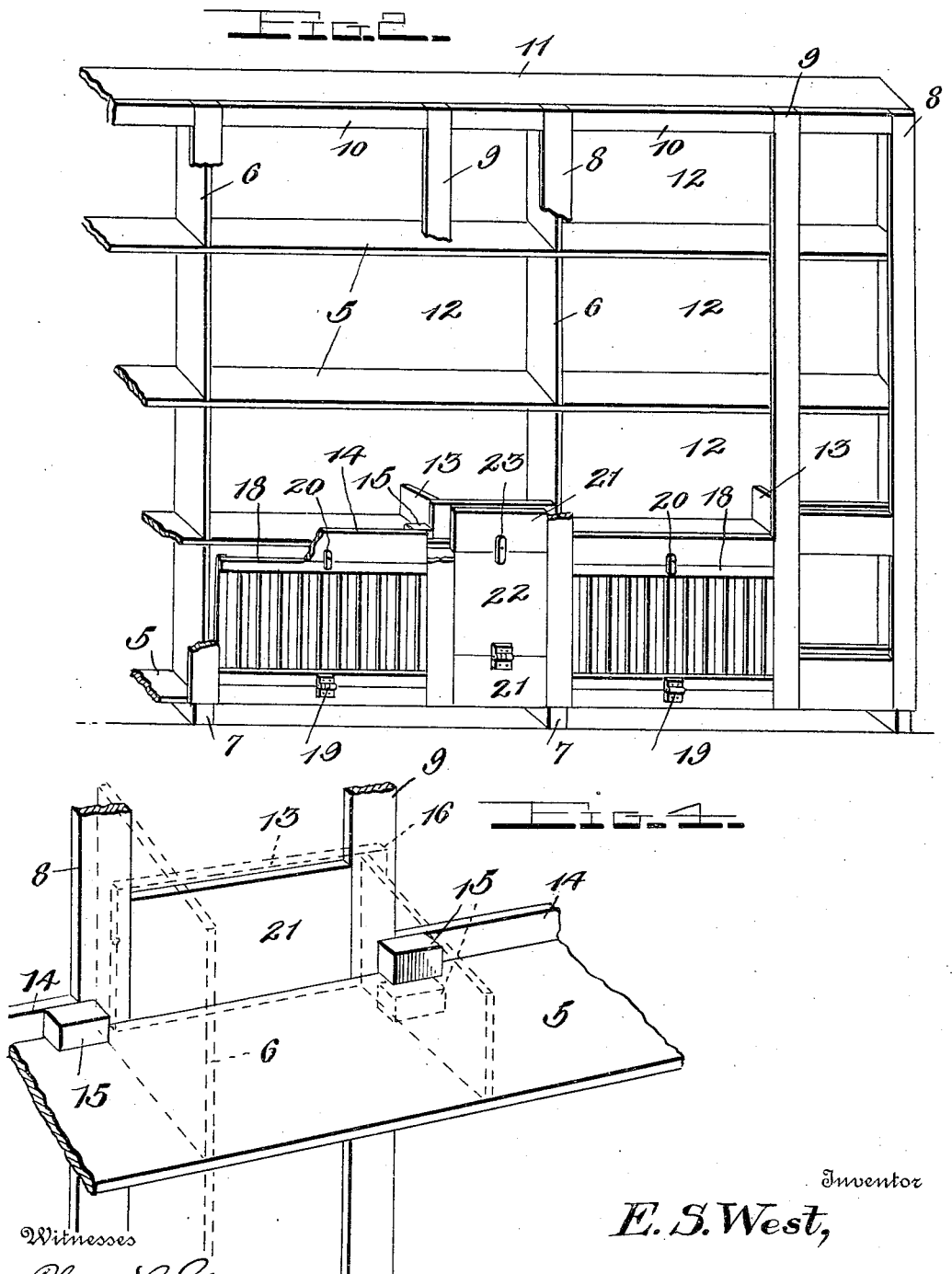

ELMER S. WEST, OF EWING, KENTUCKY.

POULTRY-HOUSE.

1,051,935.   Specification of Letters Patent.   Patented Feb. 4, 1913.

Application filed November 29, 1911. Serial No. 663,024.

*To all whom it may concern:*

Be it known that I, ELMER S. WEST, a citizen of the United States, residing at Ewing, in the county of Fleming and State of Kentucky, have invented certain new and useful Improvements in Poultry-Houses, of which the following is a specification, reference being had to the accompanying drawings.

This invention relates to certain new and useful improvements in poultry houses and has for its object to provide a nest house for chickens and other poultry which is so constructed that certain parts thereof may be readily removed to afford easy access to the interior of the houses whereby the same may be thoroughly cleaned and kept in a perfectly sanitary condition.

A further and more specific object of the invention resides in the provision of a plurality of nest compartments built in tiers, and a removable front wall for each of said compartments to permit of the removal of the nest box, said wall when in its assembled position co-acting with the nest box to prevent its casual movement in the compartment.

Still another object of the invention is to provide a poultry house of the above character which is simple and durable in construction, and may be built at a minimum cost without necessitating the employment of skilled labor.

With the above and other objects in view, the invention consists of the novel features of construction, combination and arrangement of parts hereinafter fully described and claimed, and illustrated in the accompanying drawings, in which—

Figure 1 is a front elevation of a poultry nesting house embodying my improvements; Fig. 2 is a perspective view, some of the parts being removed and others broken away; Fig. 3 is a detail vertical section taken on the line 3—3 of Fig. 1; and Fig. 4 is a detail fragmentary perspective view showing the means for assembling certain of the parts and retaining the nest box in position.

Referring in detail to the drawings 5 designates a plurality of parallel horizontal floors which are rigidly fixed to and supported by the spaced vertical uprights 6, the lowermost floor 5 being arranged on the transverse beams 7. In the construction of my improved nesting house, the same may be built against the wall of a building or may be provided with a rear wall if desired. In the drawings which illustrate one embodiment of the invention, the former method is employed.

To the front edges of the vertical boards or uprights 6, the bars 8 are secured, said bars extending the entire height of the uprights. Vertical bars 9 are also arranged adjacent to each of the uprights 6 at one side thereof and are fixed at their upper ends to a longitudinal beam 10 upon which the top or roof 11 of the house is secured, said beam and roof being also fixed to the upper ends of said uprights. By means of this construction it will be seen that a plurality of compartments 12 are provided. Each of these compartments is adapted to house a hen or other fowl and within the same a nesting box 13 is arranged. This nesting box consists of two walls arranged at right angles to each other, the uprights 6 forming the other side wall of the box and the rear wall of the house or the face of the building against which it is built forming the rear vertical wall of the nesting box. This box is arranged in one end of the compartment 12 as clearly shown in Fig. 2. The longitudinal members 14 are arranged upon the front edges of the floors 5 and extend between the nest 13 and the vertical walls 6 which are spaced farthest therefrom. The longitudinal edges of these members 14 project above and below the floors and at one of their ends are provided with the spaced blocks 15 between which the front longitudinal edges of the floors 5 are adapted to be received. It will be noted from reference to Fig. 4 that the end of the front wall of the nest extends beyond the front end of the side wall of said nest to which it is secured, thereby providing a projecting ledge or shoulder indicated at 16 with which the uppermost block 15 on the end of the member 14 engages, said block holding the nest against transverse movement between the vertical bar 9 and the rear wall of the compartment. A single supporting block 15 is also provided upon the other end of the member 14 and engages upon the upper surface of the floor 5. Turn-buttons 17 are arranged upon the bars 8 to engage over the latter ends of the member 14 and hold the same against outward movement. By this construction it will be seen that when the members 14 are arranged upon the front edges of the floors 5, the nests 13 are securely held in their positions within the compartments against either longitudinal or transverse movement.

Upon the upper edges of the members 14 the latticed doors 18 are hinged as indicated at 19 and upon the lower edges of said bars the turn-buttons 20 are arranged to engage over the free edge of the door immediately beneath said member and hold the same in its closed position. The front walls of the nest 13 have the boards 21 secured thereto which are disposed between the bars 8 and 9 and are flush with the outer faces thereof. Doors 22 are hinged upon the upper edges of these boards to close the space between the nests and the several floor boards 5, the doors being held in their closed positions by means of the turn-buttons 23 carried by the several nest members and by the upper longitudinal beam 10.

When it is desired to remove any one of the nests, the member 14 associated therewith is first removed, the door 18 immediately below said member being open. The nest is now moved longitudinally within the compartment 12 so that it may be removed through the space normally closed by the door 18. The portion of the interior of the compartments not occupied by the nests provide extensive runways for the fowls so that they may obtain the necessary exercise to insure their healthy condition. The beams 7 space the lowermost floor board 5 from the ground so that the lower tier of nests will not be affected by the dampness.

From the foregoing it is believed that the construction and manner of assembling the various parts of my improved hen house will be fully understood. It is only necessary to remove the members 14 and the nests to obtain access to all parts of the interior of the structure so that the same can be thoroughly cleaned out and at all times maintained in a sanitary condition. This greatly inures to a healthy production of chicks and overcomes objections of this character which are common to the ordinary poultry houses.

It will of course be obvious that the structure shown in the drawings may be modified in many particulars and that the number of compartments or cells may be increased or decreased. It will further be understood that while I have shown and described the preferred form and construction of the various parts, they are susceptible of considerable modification without departing from the essential feature or sacrificing any of the advantages of the invention.

Having thus described the invention what is claimed is:—

1. A structure of the character described comprising spaced upright walls, a plurality of parallel horizontal floors forming tiers of compartments between said upright walls, nests arranged in one end of the compartments against said upright walls and spaced from the opposite upright wall to provide runways, means removably mounted upon the front edges of the floors to prevent longitudinal movement of the nests in the compartments, and doors for said runways carried by said nest holding means.

2. A structure of the character described comprising spaced upright floors, parallel horizontal walls arranged between the upright walls and forming a plurality of compartments, nests arranged within the compartments, stop members to prevent outward movement of the nests, and retaining members for said nests longitudinally arranged upon the front edges of said floors, means to removably secure said members in position, said members holding the nests against longitudinal movement within the compartments.

3. A structure of the character described comprising spaced upright floors, parallel horizontal walls arranged between said upright walls and forming a plurality of compartments, a nest arranged in each of the compartments, said nests each engaging one of the upright walls and spaced from the opposed upright wall to provide runways in the compartments, retaining bars arranged upon the front edges of said floors and having means engaging the nest to hold the same against longitudinal movement in the compartments, and a door for each of the runways hingedly mounted upon said retaining bars.

4. A structure of the character described comprising spaced vertical floors, parallel horizontal walls arranged between the vertical walls and forming a plurality of compartments, nests adapted to be arranged in one end of the compartments, stop members to prevent outward movement of the nests, retaining members longitudinally arranged upon the front edges of the floors, means to hold said members in position, blocks carried by said members to engage upon the upper and lower surfaces of said floors, said blocks also co-acting with the nests to hold the same against longitudinal movement.

5. A structure of the character described comprising spaced vertical floors, parallel horizontal walls arranged between said vertical walls and forming a plurality of compartments, nests adapted to be arranged in one end of the compartments, stop members to prevent outward movement of the nests, retaining members for said nests adapted to be arranged upon the front edges of said floors, vertical members secured to the front edges of said walls and common to them all, means on the vertical members to hold the retaining members in position, and spaced blocks carried by said retaining members disposed above and below said floors to hold the front walls of the nests between said vertical members and the blocks whereby their longitudinal movement is prevented.

6. A structure of the character described comprising spaced vertical floors, parallel horizontal walls arranged between the vertical walls and forming a plurality of compartments, vertical members arranged in spaced relation to said vertical walls, similar members secured to the front edges of said walls, nests arranged in the compartments, said members preventing the outward movement of the nests, longitudinal retaining bars arranged upon the front edges of said floors, blocks arranged on one end of said retaining members and disposed above and below the horizontal walls and co-acting with the front wall of the nest to hold the nests against inward movement, and doors hinged upon said retaining members, the removal of said doors and members permitting of the longitudinal movement of the nests whereby they may be removed from the compartments.

7. The combination with a poultry house having a plurality of nest compartments, of a nest removably arranged in each of the compartments and provided with a hinged door on its front end, said nests being arranged in superposed relation, and latch members carried by the nests to engage the door of the adjacent lower nest to hold the same in its closed position.

8. The combination with a poultry house having a plurality of nest compartments, a nest arranged in one end of each of the compartments and forming runways therein, longitudinal retaining bars removably mounted upon the front edges of the floors of said compartments and having means to prevent longitudinal movement of the nests, a door for each of said runways hinged upon said retaining bars, and latch members carried by the retaining bars to engage the door immediately below the same and hold said door in its closed position.

9. The combination with a poultry house comprising spaced vertical walls and parallel floors to form a plurality of nest compartments, spaced vertical bars secured upon the front edges of said floors, of a nest arranged in one end of each of the compartments, the front walls of said nests extending upon the inner faces of said vertical bars whereby outward movement of the nests is prevented, longitudinal bars arranged upon the front edges of the floors, means to hold said bars in position and blocks on the ends of said bars extending behind said vertical bars and engaging said nests to prevent their longitudinal movement in the compartments.

In testimony whereof I hereunto affix my signature in the presence of two witnesses.

ELMER S. WEST.

Witnesses:
T. H. TALBOTT,
R. J. TOUSLEY.

---

Copies of this patent may be obtained for five cents each, by addressing the "Commissioner of Patents, Washington, D. C."